United States Patent [19]

Bradshaw

[11] 3,755,958

[45] Sept. 4, 1973

[54] INSECT TRAP

[75] Inventor: Thomas I. Bradshaw, St. Paul, Minn.

[73] Assignee: Minnesota Mining and Manufacturing Company, St. Paul, Minn.

[22] Filed: Jan. 10, 1972

[21] Appl. No.: 216,836

Related U.S. Application Data

[63] Continuation of Ser. No. 870,032, Oct. 28, 1969, abandoned.

[52] U.S. Cl. ................................................. 43/114
[51] Int. Cl. ............................................ A01m 1/14
[58] Field of Search ....................... 43/114, 115, 136

[56] References Cited
UNITED STATES PATENTS

| | | |
|---|---|---|
| 1,112,064 | 9/1914 | Gordon ................................ 43/114 |
| 884,095 | 4/1908 | Kronenberg et al. ................ 43/114 |
| 2,258,683 | 10/1941 | Ketterer .............................. 43/114 |
| 813,196 | 2/1906 | Bien .................................... 43/114 |

Primary Examiner—Warner H. Camp
Attorney—Kinney, Alexander, Sell, Steldt and Delahunt

[57] ABSTRACT

A disposable, collapsible insect trap comprising a generally rectangular housing open at at least one end containing therein an insect attractant and a tacky substance, the combination of which is used to attract the insects into the trap and hold them therein.

3 Claims, 3 Drawing Figures

PATENTED SEP 4 1973

3,755,958

INVENTOR.
THOMAS I. BRADSHAW
BY Kinney, Alexander,
Sell, Steldt & DeLaHunt
ATTORNEYS

INSECT TRAP

This application is a continuation of my co-pending application Ser. No. 870,032, filed Oct. 28, 1969, now abandoned.

BACKGROUND OF THE INVENTION

The present invention relates to a disposable, collapsible device for trapping insects. More particularly, the invention relates to an insect trap which traps insects through the use of an insect attractant and a tacky, insect entangling substance to hold the insects in the trap when attracted therein. The substances used to attract and hold the insects in the trap are not hazardous to animals and the trapping device itself is economical, easy to use, and may be easily disposed of after use.

Insects, even though there have been many technical advances in preventive entomology, still present a serious problem both hygienically and economically. Insects attack food-producing plants and their produce, transport disease-producing organisms, cause pain and discomfort by bites and stings, and are nuisances in many other ways. Various methods have been devised in an attempt to control various insect pests but have not always been found to be satisfactory for many applications. Most chemical insecticides are toxic and hazardous to birds, fish, animals, and even humans in relatively small amounts. Even extremely minute amounts are hazardous to some species. The damage caused to the environment by chemical insecticides is sometimes greater than the total benefit obtained through their use. Thus, the search has continued for economical, effective, convenient and non-hazardous methods to control insects.

There are, at present, insect trapping devices which employ chemical insecticides therein. An example of such a device is described in U. S. Pat. No. 3,173,223. None of the known devices, however, are practical for large scale trapping and killing of insects as they are generally bulky and inconvenient to transport and store and many are also complex and expensive to use. Further, the devices used at present are not effective for a wide variety of applications.

Collapsible insect traps are known in the art: see U. S. Pat. No. 1,112,064. The prior art traps are designed for use in buildings and their construction is not suitable for use in exposed environments where natural elements would cause such traps to collapse.

SUMMARY OF THE INVENTION

According to the present invention, a convenient, disposable insect trapping device is provided which is inexpensive and ideally suited for large scale trapping of insect pests. The device contemplates the use of a collapsible container having therein an insect attractant in combination with a tacky substance to hold the insect in the trap after it has been drawn in by the attractant.

The insect trapping device of the present invention comprises generally a collapsible container having two open ends, an attractant for insects located within the device, preferably on the inner walls of the container, and a tacky substance on the inner surfaces of the device, preferably in combination with said attractant, distributed on the inner walls of the container, the combination of which draws insects into the trap and, upon contact with the inner surface, holds them therein.

The invention will be better understood with reference to the drawings, wherein.

Figure 1:
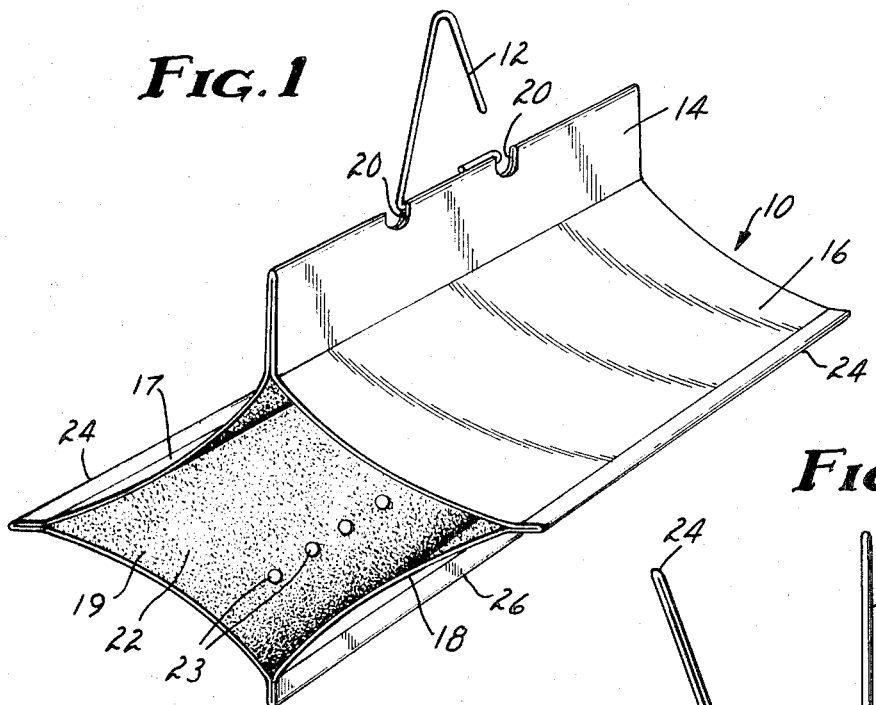
FIG. 1 is a perspective view of the insect trapping device of the present invention.

The insect trapping device of the present invention, designated as 10, comprises essentially, in its open position, a generally diamond-shape or rectangular container having two top walls 16 and 17 forming a ceiling, and two bottom walls 18 and 19 forming a floor. The container may be formed from a substantially rectangular sheet of suitable material, which, when folded, provides a container with an approximately rectangular cross-section wherein the two opposed ends are open. However, the exact shape of the container or the number of sides is in no way critical to the efficient operation of the device, and various geometric cross-sections may be chosen for the configuration of the container, such as triangles, hexagons, and the like. In order to permit ease of construction of the device, to facilitate its use, and to maximize stability during use, an approximately rectangular cross-section, which includes diamond shaped, square, rhomboid, parallelogram and the like, is presently preferred.

The insect trap container is formed by folding a sheet of the suitable material in such a way as to obtain the desired number of joints or folds at 14, 24, and 26. In the preferred embodiment, joints are preferably fastened by heat sealing, although the joints may be reinforced by any suitable fastening means, such as taping, clamping, gluing, stapling, etc., to increase the structural stability of the trap to natural hazards such as wind and rain.

The preferred configuration for the insect trap has two opposed open ends, since this configuration requires a smaller sheet of container material and less folding and manipulation to obtain the desired trap. However, the invention also contemplates modification of the container wherein one end is closed, as only one open end would be necessary to draw insects into the trap and hold them there. An obvious advantage of having two open ends is that it exposes a much larger entry area to the insects, thereby substantially increasing the possibility of insects entering the trap and also allows wind to blow through the trap setting up currents of air containing the scent of the attractant which insects may use as a guide to the trap.

The insect trap may be mounted in numerous ways, preferably by employing a hanging device 12 which is pivotably attached 20 to the trap at or near the top joint 14. Such a hanging device may be inserted in the joint during manufacture or may be thereafter taped, clamped, glued, stapled, or otherwise fastened to the joint when closed. The hanging device 12 is then merely placed over some object in the area in which insect control is sought, e.g., the branch of a tree. The trap could, however, also be set in any appropriate holder and fastened thereto to obtain a stable configuration without support. The trap may also be fastened to any available material, such as a fence, in the area in which insect control is sought. The traps may also be placed in a particular area by merely throwing them into trees, bushes, etc.

An extension of this procedure is dropping them on orchards and crops from an airplane, where the traps eventually come to rest on the tree branches. This method allows expedient distribution of the traps over a large area in short periods of time.

Figure 2:
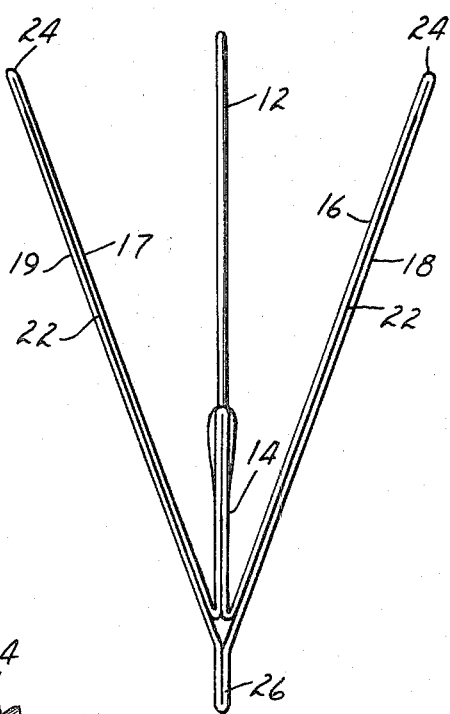
FIG. 2 is a view of the trap in its collapsed, packaged state.

In the preferred embodiment, the hanging device 12 also serves to aid in another function. As illustrated in FIG. 2, the insect trap, prior to use, for purposes of packaging and shipping and for carrying into the field, is folded in such a way so that the top walls 16 and 17 are flush with the bottom walls 18 and 19 forming a small, flat, compact unit. In its collapsed position, the trap comprises a flat, elongated sheet of flexible, semi-rigid material having fold lines 24 and 26 corresponding to about one-fourth the length of the sheet, the ends of the sheet being attached 14 to form a collapsed container having its inner surfaces in close proximity when in such a flat, collapsed position. The tacky insect entangling material 22 is disposed on at least one of the inner surfaces forming a continuous layer between the inner surfaces, and a hanging device 12 is attached 20 to the container. When the trap is to be used, the bottom joint 26 is held in one hand and, with the other hand, the hanging device 12 is grasped and pulled outward, pulling the walls away from each other to form the device illustrated in FIG. 1 having the tacky material disposed on the inner surfaces. There may also be an additional tab attached to the joint 26 to facilitate this procedure.

The collapsibility of the trap is a distinct advantage as large numbers of such traps may be taken into the field at one time due to the small bulk of the trap in the collapsed state, whereas large bulky traps use up a large amount of space both during shipment and when taking them into the field to be used. It is further preferred that the hanging device, or part of the hanging device, be sufficiently flexible to allow it to be closed tightly when it is suspended from a projection such as the tree limb, nail, wood rod, or the like. Although a metal hanging device is preferred and is readily available for most applications, any suitable material may be used.

Materials from which a collapsible container 10 may be constructed are sheets of semi-rigid plastic; for example polyethylene, polypropylene, and the like; metal foil, such as aluminum foil; or preferably paper, which may be treated to render such paper essentially grease and water proof. Paper is preferred because it is inexpensive, easy to work with, light, and renders the trap more easily disposable. The paper should be of sufficient weight to maintain dimensional stability, for example, 0.009 point tag stock which may be treated with wax, polyethylene, silicones, and the like to give a grease and rain resistant surface. The grease-resistant surface is desirable to resist migration of the tacky substance coated on the inner walls into the paper which would decrease its availability to insects flying into the trap. Water resistance is desirable as the trap will very often be exposed to rain, dew, or other moisture phenomena. The color of the paper is not known to be critical, but certain colors are known to attract insects, some colors more than others. For example, one species of aphid (a type of plant lice) is attracted by the color yellow and the pink boll worm moth is attracted by fluorescent green. The trap may employ one or more of these colors thereon and eliminate the attractant, or the two may be used together. In a further embodiment, a light-emitting fluorescent paint may be used on the trap to attract insects. The floor of the trap may also have a plurality of small holes 30 therein to facilitate drainage of moisture that may gather in the trap.

The traps are generally packaged individually but may also be removably attached to each other at some point on the container. For example, paper having a series of perforations extending thereacross may be used to attach the traps to each other at one of the folds. When the traps are to be used, the traps are pulled away from each other, tearing the paper along the perforations, freeing a single trap which may then be placed.

The tacky substance 22 which catches and thus kills insects is placed on the inner walls of the insect trapping device during manufacture. The material used must maintain its tackiness when exposed to environmental conditions, such as wind, rain, etc. Examples of such substances are solutions of gum, rubber, and mineral oil, polybutenes, and mixtures of wax and resins. The substance is coated on one or more inner surfaces of the container before the joint 26 is formed. Preferably it is coated on all four walls of the inner surface, although one or two may be satisfactory. During the folded stage of the insect trap, significant amounts of the tacky substance may be transferred to the other inner surfaces of the container, allowing all the inner surfaces of the container to be available for trapping insects. The trap may also contain an insecticide which may be used alone or in conjunction with the tacky material. The use of an insecticide would aid in the destruction of insects which do not come in contact with the tacky material.

The insect attractant which is used may be any suitable substance which attracts one or more species of insects. Said substances include sex (or mating) attractants, swarming attractants, feeding attractants, and the like. Known sex attractants include cis–11–tetradecenyl acetate ("riblure"), cis–7–hexadecenyl acetate ("hexylure"), cis–7–dodecen–1–ol, trans–10–cis–1-2–hexadecadien–1–ol, and d–10–acetoxy-cis–7–hexadecen–1–ol. The attractants may be effective by themselves, may require a synergist, or may be used in combinations. The type of attractant used will depend entirely upon the type of insects desired to be trapped and would be obvious to those skilled in the art. Generally, such substances are naturally occurring and substantially nontoxic.

The attractant may be placed in the trap in a manner designed to permit its gradual, as well as immediate, release. Various methods are available. The attractant may be mixed with melted paraffin wax and the mixture applied to the inner walls of the container as droplets 23 before or after the tacky substance 22 is applied, allowing the mixture to solidify. The paraffin used may have a high or low melting point, depending upon the conditions to which it will be exposed, since it is preferable that it remain solid. Another, and most preferred, method of containing the attractant is to place it in a plastic container, seal the container at the time the trap is set, and place the container holding the attractant in the tacky substance. This procedure generally holds such attractant container securely in the trap. The material used for the container must be such that the attractant will be allowed to diffuse therethrough. Other methods useful for permitting the gradual release of the attractant include encapsulation with plastic or glass bubbles, and incorporation within the container material. If desired, a colorant or dye may be added to the attractant mixture in order to clearly indicate its presence to those using the trap.

Figure 3:
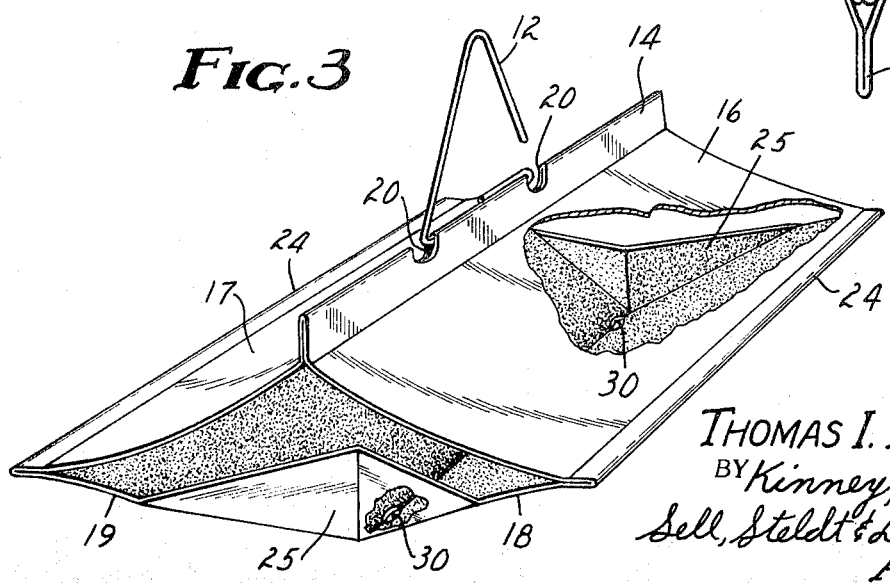
FIG. 3 is a partial cut-away of an insect trapping device having an insect directing means.

In a further embodiment of the invention, as illustrated in FIG. 3, the bottom of the trap, or floor 18 and 19, may be adapted to form an indentation 25 or guide at each end of the trap. By folding up a portion of the floor 18 and 19 along fold lines as shown, a smaller entrance is available for the insect which serves to direct the insect upward toward the inside of the top walls 16 and 17 which is covered with a tacky material. Such an adaptation increases the chances of all insects coming in contact with the tacky material rather than merely flying completely through the trap. Further, the folded portion serves as a restrictive wall decreasing the chances of insects escaping or falling out of the trap once they have entered. The indentation also serves to add rigidity to the trap, preventing the trap from closing when exposed to outdoor conditions. In all other aspects, the trap is fabricated according to the same procedures and from the same materials as heretofore described.

The invention will be further understood by reference to the following illustrative, but nonlimiting examples, in which all parts are by weight unless otherwise noted.

EXAMPLE 1

A 6 inch by 11 inch piece of card designated 0.009 point bleached tag stock (commercially available from H. P. Smith Paper Co., Chicago, Illinois) is coated on both sides with polyethylene to make it water and grease proof. The card was folded symmetrically across the longitudinal axis to provide two equal sections and creased firmly on the fold. The sections were again folded symmetrically, parallel to the first fold, with a slight (5-percent) overlap of the open ends, and the folds were creased firmly.

Several drops of a hot mixture of paraffin wax, cis-1-1-tetradecenyl acetate ("riblure"), the sex attractant of the female red-banded leaf roller moth, and dodecyl acetate, which is a known synergist for "riblure", were placed on the card and allowed to solidify. The attractant mixture consists of 40 percent "riblure" and 60 percent acetate. The amount of paraffin wax used was about 85 to 95 percent by weight. About 15 mg. of attractant mixture per trap was used. The paper was further treated with a tacky substance, "Bird Tanglefoot", commercially available from the Tanglefoot Co., Grand Rapids, Michigan. The tacky substance consisted of 97 percent polybutenes and 3 percent hydrogenated castor oil. The card was then stapled along the bottom and side joints.

A hanging device, consisting of a triangular metal wire hook, was attached to the top of the trap by a piece of pressure-sensitive tape. The card was then folded so that the two ends of the card came together at the hanging device to give it a generally diamond shape as illustrated in the drawings.

The traps were then placed on the branches of apple trees where the red-banded leaf roller moth had become a serious problem in recent years. The traps were checked periodically and were found to be an effective means of trapping this moth.

EXAMPLE 2

Traps prepared according to the procedure of Example 1 were suspended from upright metal rods on a ten acre cotton field and were oriented to hang just below the cotton canopy and spaced in clear rows at least 20 feet apart. The cotton was about 5 feet tall. The traps, prebaited with cis–7–hexadecenyl acetate (hexylure), the female pink boll worm attractant, consistently caught male pink boll worm moths.

What I claim is:

1. An erectable insect trapping device, comprising four rectangular sides joined along adjacent edges to form a hollow quadrilateral container, said sides being formed of a flexible material with the edges of said sides being joined at folds and with three of said folds being reinforced to give structural stability; a hanging device fastened to said container centrally of one of said reinforced folds; a tacky insect-entangling substance on the inner surface of said sides to hold insects therein upon contact with said substance; and two adjacent sides of said trap having fold lines extending from the ends of said adjacent sides at an acute angle to said ends, the fold lines from said ends meeting at the fourth fold of the device and at the common fold line of said adjacent sides to form indentations, which indentations will direct insects into the trap, decrease the chances of insects falling out, and impart increased rigidity.

2. The device of claim 1, having therein an attractant to draw insects into the trap.

3. The device of claim 1, wherein said flexible material is greaseproof and waterproof paper.

* * * * *

UNITED STATES PATENT OFFICE
CERTIFICATE OF CORRECTION

Patent No. 3,755,958          Dated September 4, 1973

Inventor(s) Thomas I. Bradshaw

It is certified that error appears in the above-identified patent and that said Letters Patent are hereby corrected as shown below:

Column 2, line 1 please insert the following paragraph:

More specifically the erectable insect trapping device of this application comprises four rectangular sides joined along adjacent edges to form a hollow quadrilateral container, said sides being joined at folds and with three of said folds being reinforced to give structural stability. A hanging device is fastened to said container centrally of one of said reinforced folds. A tacky insect entangling substance is on the inner surface of said sides to hold insects therein upon contact with said substance. Two adjacent sides of the trap have fold lines extending from the ends of said adjacent sides at an acute angle to said ends, the fold lines from said ends meeting at the fourth fold of the device and at the common fold line of said adjacent sides to form indentations, which indentations will direct insects into the trap, decrease the chances of insects falling out, and impart increased rigidity.

Column 5, line 38 after slight cancel "(5-percent)" and insert -- (5-10 percent) --.

Signed and sealed this 25th day of June 1974.

(SEAL)
Attest:

EDWARD M. FLETCHER, JR.
Attesting Officer

C. MARSHALL DANN
Commissioner of Patents